US012565408B2

(12) United States Patent
Pousset

(10) Patent No.: US 12,565,408 B2
(45) Date of Patent: Mar. 3, 2026

(54) HANDLING MACHINE WITH TELESCOPIC ARM

(71) Applicant: MANITOU BF, Ancenis (FR)

(72) Inventor: Alexis Pousset, Ancenis (FR)

(73) Assignee: MANITOU BF, Ancenis (FR)

( * ) Notice: Subject to any disclaimer, the term of this patent is extended or adjusted under 35 U.S.C. 154(b) by 374 days.

(21) Appl. No.: 18/252,330

(22) PCT Filed: Nov. 16, 2021

(86) PCT No.: PCT/FR2021/052024
§ 371 (c)(1),
(2) Date: May 9, 2023

(87) PCT Pub. No.: WO2022/106778
PCT Pub. Date: May 27, 2022

(65) Prior Publication Data

US 2024/0010479 A1 Jan. 11, 2024

(30) Foreign Application Priority Data

Nov. 19, 2020 (FR) ...................................... 2011891

(51) Int. Cl.
*B66F 9/06* (2006.01)
*B66F 9/065* (2006.01)
(Continued)

(52) U.S. Cl.
CPC .............. *B66F 9/0655* (2013.01); *B66F 9/22* (2013.01); *E02F 3/286* (2013.01); *E02F 3/422* (2013.01);
(Continued)

(58) Field of Classification Search
CPC ......... B66F 9/0655; E02F 3/286; E02F 3/306; B66C 23/705
See application file for complete search history.

(56) References Cited

U.S. PATENT DOCUMENTS

2016/0221803 A1* 8/2016 Kawabuchi ........... B66C 23/705

FOREIGN PATENT DOCUMENTS

| | | | | |
|---|---|---|---|---|
| BE | 806492 A | | 2/1974 | |
| CN | 109969993 A | * | 7/2019 | ............ B66F 9/0655 |
| EP | 1787939 A2 | * | 5/2007 | ............ B66F 9/0655 |

OTHER PUBLICATIONS

International Search Report and Written Opinion mailed Feb. 25, 2022 for International Patent Application No. PCT/FR2021/052024.

* cited by examiner

*Primary Examiner* — Abiy Teka
(74) *Attorney, Agent, or Firm* — Husch Blackwell LLP

(57) ABSTRACT

A handling machine with a telescopic arm including a hydraulic actuator system carried by a second section of the arm mounted so as to slide inside a first section, and a hydraulic control circuit that includes a pipe system that extends at least partly inside the arm and is connected to the hydraulic actuator system in order to supply the hydraulic actuator system. The pipe system includes at least one flexible hydraulic pipe that extends inside the arm and has a first portion fixedly mounted to the first section; a second portion fixedly mounted to the second section; and a U-shaped third portion connecting the first portion and the second portion to one another. The concave side of the U-shaped third portion is oriented towards the end of the first section that is opposite the end of the first section.

17 Claims, 7 Drawing Sheets

(51) Int. Cl.

| | |
|---|---|
| ***B66F 9/22*** | (2006.01) |
| ***E02F 3/28*** | (2006.01) |
| ***E02F 3/42*** | (2006.01) |
| ***E02F 9/22*** | (2006.01) |
| *E02F 3/38* | (2006.01) |

(52) U.S. Cl.

CPC .......... *E02F 9/2203* (2013.01); *E02F 9/2271* (2013.01); *E02F 9/2275* (2013.01); *E02F 3/38* (2013.01)

HANDLING MACHINE WITH TELESCOPIC ARM

TECHNOLOGY FIELD

The present disclosure generally relates to handling machines with a telescopic arm.

BACKGROUND

Handling machines with a telescopic arm are known from the prior art.

An exemplary telescopic arm known from the prior art is illustrated in FIG. 1. The telescopic arm 2A comprises a first section 21A and a second section 22A mounted so as to be able to slide in relation to the first section 21A.

A telescopic ram 23A present inside the arm makes it possible to displace the second section 22A so as to lengthen or shorten the telescopic arm, that is to say to control the arm between its retracted position and its extended position.

The machine also comprises a tool holder 5A which is coupled to the end of the second section 22A, and to which a tool, such as forks or a bucket, can be coupled.

A hydraulic inclination ram 6A is coupled to the second section 22A and to the tool holder 5A so as to be able to incline the tool holder.

The arm may also be fitted with one or more other hydraulic members or rams, such as a hydraulic motor, for commanding one or more other accessories.

The inclination ram or the one or more other hydraulic members or rams for controlling accessories is actuated using one or more flexible hydraulic pipes 4A, also referred to as supply hoses, which pass through the inside of the telescopic arm.

However, it will be noted that the one or more flexible pipes 4A which pass through the inside of the telescopic arm can experience malfunctions, or be damaged when the telescopic arm is being transferred from its retracted position to its extended position, and vice versa.

Document EP1787939 discloses a vehicle with a telescopic arm having a hydraulic pipe system. However, the arrangement of the telescopic ram and of the hydraulic pipe system on the inside of the arm also runs the risk of causing malfunctions or damage of the arm and/or of the hydraulic pipe system while the telescopic arm is being transferred from its retracted position to its extended position, and vice versa.

Document BE806492 also discloses a vehicle with a telescopic arm having a hydraulic pipe system. However, the arrangement of the hydraulic pipe system on the inside of the arm creates significant bulk and requires the arm to have a considerable width.

The aim of the present disclosure is to propose a new handling machine with a telescopic arm that makes it possible to overcome all or some of the problems set out above.

SUMMARY

To that end, a subject of the disclosure is a handling machine comprising: a telescopic arm including a first section and a second section mounted so as to be able to slide into the first section; a telescopic ram configured to displace the second section in relation to the first section; a hydraulic actuator system borne by the second section of the telescopic arm; and a hydraulic control circuit including a hydraulic pipe system extending at least partially inside the arm and attaching to the hydraulic actuator system to supply the hydraulic actuator system; wherein, the telescopic ram includes a ram body mounted fixedly in relation to the first section and a ram rod mounted so as to be able to slide between a retracted position in the ram body and an extended position, the hydraulic pipe system includes at least one flexible hydraulic pipe extending inside the arm and includes: a first portion fixed in relation to the first section; a second portion; fixed in relation to the second section; and a U-shaped third portion; connecting the first portion and the second portion to one another; the concavity of the U-shaped third portion being oriented toward a distal end of the first section, the distal end being opposite a proximal end of the first section, the proximal end defining an opening, the second section extending into the opening, such that, when the ram rod is transferred from the retracted position to the extended position, the U-shaped third portion is displaced along that part of the ram rod of the telescopic ram that extends out of the ram body.

Such an arrangement of the one of more flexible hydraulic pipes for supplying the hydraulic actuator system makes it possible to obtain a handling machine with a telescopic arm for which one or more flexible hydraulic pipes can pass through the inside of the telescopic arm, whilst still limiting the risk of malfunction or damage of the one or more flexible hydraulic pipes for supplying the inclination ram and/or one or more hydraulic accessories.

In particular, with such an arrangement on the inside of the arm, the displacement of the U-shaped part of the or each flexible hydraulic pipe, in the course of the extension or retraction of the arm, is carried out mainly along that part of the rod of the telescopic ram that extends out of the body of the ram, such that the or each flexible hydraulic pipe, more particularly the bent portion of this flexible hydraulic pipe, can be displaced during the movement of the second section in relation to the first section in a sufficiently wide environment corresponding to the space between the rod of the telescopic ram and the internal wall of the second arm section, which leaves a functional clearance sufficient for the or each flexible hydraulic pipe.

This reduces the risk of malfunction or damage of the arm and/or of the one or more flexible hydraulic pipes for supplying the inclination ram and/or one or more accessories.

Such a design of the system is particularly advantageously applicable in the case of a machine of compact type, the telescopic arm of which has an overall width of about 200 millimeters, compared with telescopic arms of other machines having a width of about 250 millimeters overall.

The system may also have one or more of the following features in any technically admissible combination.

In one embodiment, the bend of the at least one flexible hydraulic pipe extends in a space of the second section at that part of the ram rod of the telescopic ram that extends out of the ram body of the telescopic ram.

In one embodiment, the first portion of the at least one flexible hydraulic pipe is fixed to the ram body of the telescopic ram.

In one embodiment, the second portion of the at least one flexible hydraulic pipe is fixed to the internal wall of the second section.

In one embodiment, the at least one flexible hydraulic pipe comprises at least one pair of flexible pipes.

In one embodiment, the at least one flexible hydraulic pipe comprises at least two pairs of flexible pipes, one of the pairs being disposed on one side of the longitudinal axis of the telescopic ram and the other pair being disposed on the other side of the longitudinal axis of the telescopic ram.

In one embodiment, with the hydraulic actuator system comprising at least one double-acting hydraulic actuator, the at least one flexible hydraulic pipe comprises, for the or each double-acting actuator, a pair of flexible hydraulic pipes, one of the flexible hydraulic pipes of the pair being configured to supply a first chamber of the double-acting actuator, and the other flexible hydraulic pipe of the pair being configured to supply a second chamber of the double-acting actuator.

In one embodiment, the flexible hydraulic pipes of one and the same pair of flexible pipes are disposed on one and the same side of the longitudinal axis of the telescopic ram, preferably on one and the same side of the vertical median plane of the arm, the vertical median plane being the plane that passes through the longitudinal axis of the arm and the vertical when the machine rests on a horizontal ground.

In one embodiment, the machine comprises a tool holder which is connected in an articulated manner to the second section and which is configured to receive a tool, such as forks or a bucket, the hydraulic actuator system comprising a hydraulic inclination ram which is coupled to the second section, preferably by way of its ram body, and to the tool holder, preferably by way of its ram rod, and which is connected to the at least one flexible hydraulic pipe to make it possible to actuate the pivoting of the tool holder in relation to the second section.

In one embodiment, with the hydraulic actuator system comprising an additional hydraulic actuator, such as an additional hydraulic ram or a hydraulic motor, for making it possible to actuate an accessory associated with the additional actuator, the additional hydraulic actuator being coupled to the second section and connected to the at least one flexible hydraulic pipe.

In one embodiment, the at least one flexible hydraulic pipe is attached to the hydraulic actuator system via the second portion, which is connected to a connection system fixed to the second section, and via at least one flexible connection pipe connected to the connection system and to the hydraulic actuator system.

In one embodiment, the arm is connected in an articulated manner to the chassis of the machine, at the rear of the machine.

In one embodiment, the U-shaped third portion is in contact with the wall of the second section to enable guidance of the third portion during the displacement of the third portion.

BRIEF DESCRIPTION OF THE DRAWINGS

Further features and advantages of the disclosure will become more apparent from the following description, which is purely illustrative and nonlimiting and should be read in conjunction with the appended drawings, in which.

DETAILED DESCRIPTION

Figure 1:
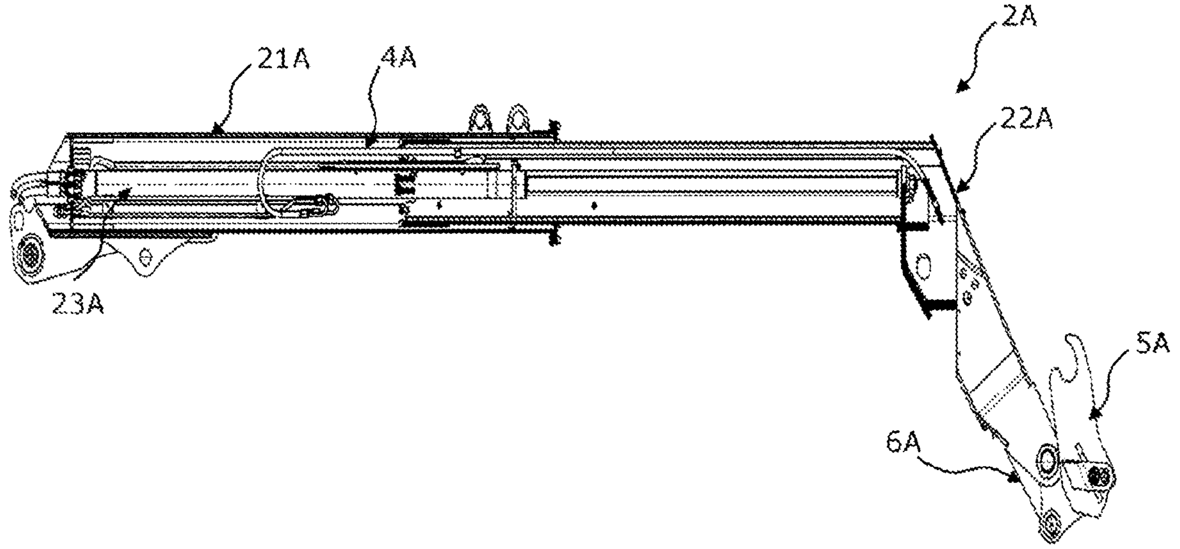
FIG.1 Prior art
FIG. 1 is a view, in longitudinal section, of a telescopic arm of a handling machine, in an embodiment known from the prior art.

The concept of the disclosure is described more comprehensively below with reference to the appended drawings, which show embodiments of the concept of the disclosure. In the drawings, the size and relative sizes of the elements may be exaggerated for clarity purposes. Similar numbers refer to similar elements in all the drawings. However, this concept of the disclosure can be implemented in numerous different forms and should not be interpreted as being limited to the embodiments set out here. Rather, these embodiments are proposed in order that this description be comprehensive, and communicate the scope of the concept of the disclosure to those skilled in the art.

A reference throughout the specification to "one/an embodiment" means that a particular functionality, structure, or feature that is described in relation to one embodiment is included in at least one embodiment of the present disclosure. As a result, where the expression "in one/an embodiment" appears at various locations throughout the specification, this does not necessarily refer to the same embodiment. In addition, the particular functionalities, structures or features may be combined in any suitable way in one or more embodiments.

What is proposed is a new handling machine, for handling loads or persons, with a telescopic arm which bears at least one hydraulic actuator, separate from the telescopic ram of the arm, and for which the risk of damage or malfunction of the one or more flexible hydraulic pipes which supply the at least one hydraulic actuator is reduced.

Figure 2:
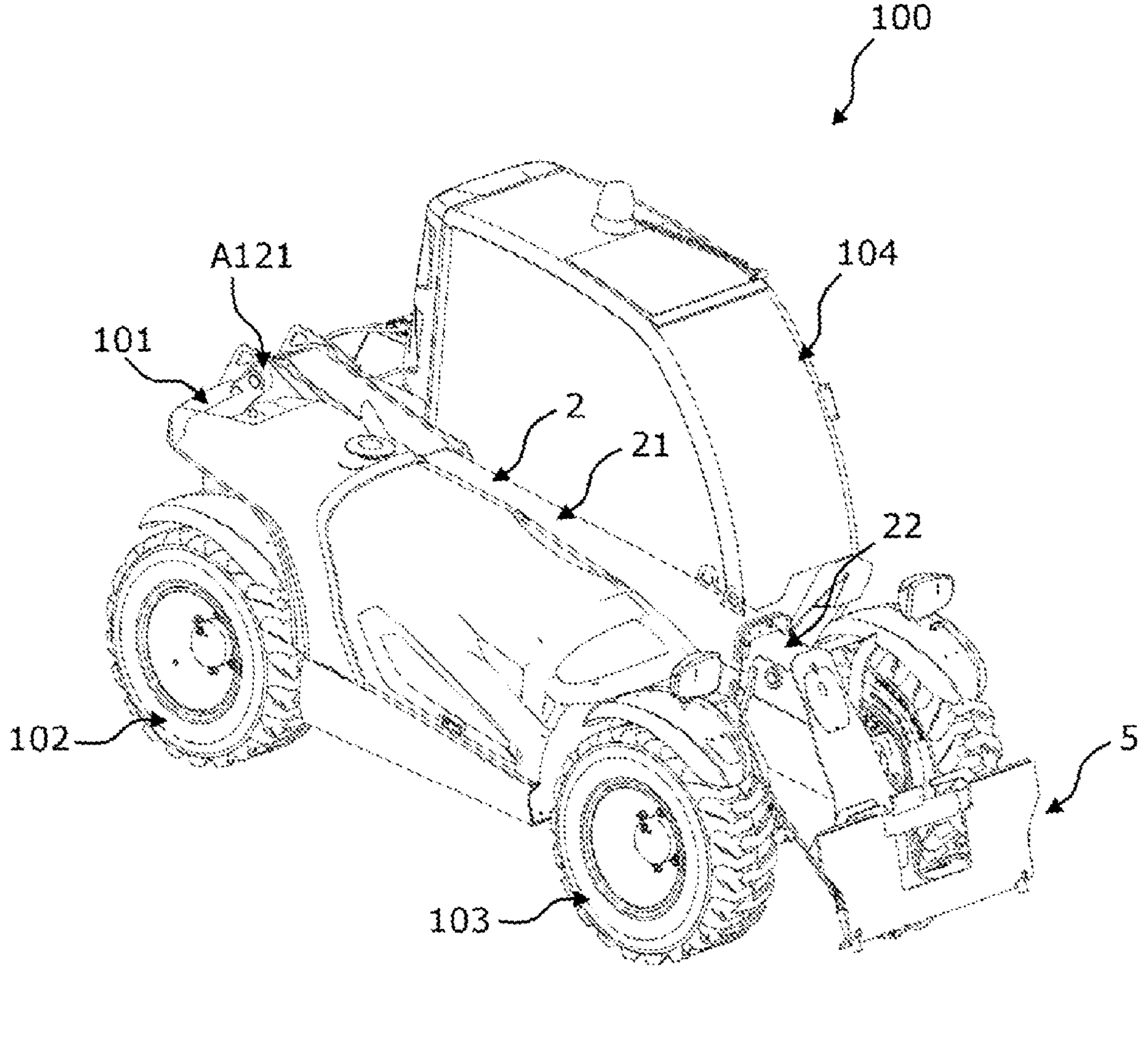
FIG. 2 is a perspective view of a machine with a telescopic arm, in one embodiment.
Figure 3:
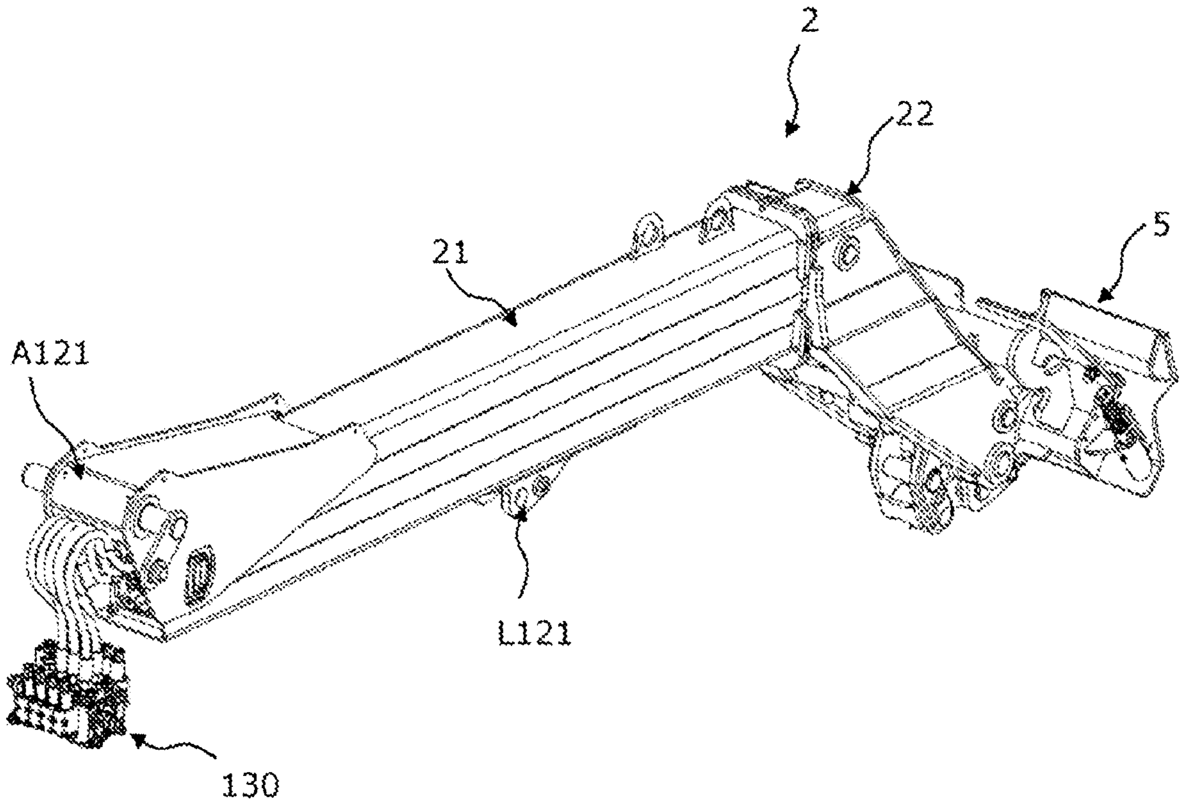
FIG. 3 is a perspective view of the telescopic arm, in the retracted position of the arm, of a machine with a telescopic arm, like that of FIG. 2, in one embodiment.

FIG. 2 shows a machine 100 with an inclinable telescopic arm, also referred to as telescopic carrier. In a variant, it is possible to provide that the disclosure is applicable to telescopic arms of other load or person handling machines, such as on-board carriers with telescopic arms or articulated loaders with telescopic arms.

The machine 100 comprises a chassis 101 provided with a rear wheelset 102, also referred to as rear axle, and a front wheelset 103, also referred to as front axle. The chassis 101 bears a telescopic arm 2 and a cab 104 intended to receive an operator.

The arm 2 extends, at least in the lowered position, along the cab 104. The arm 2 extends on that side of the cab that is closest to the longitudinal axis of the machine. The longitudinal axis of the machine is considered to be the median longitudinal axis which extends between the wheels of the machine.

The machine comprises a system for displacing the machine in relation to the ground, which system comprises an engine, for example combustion and/or electric engine, configured to make it possible to displace the machine in relation to the ground. The operator can control the displacement of the machine using a driver station comprising, for example, a steering wheel and pedals connected to the system for displacing the machine.

The machine also comprises one or more controllers, such as a joystick, for controlling the lifting and the length of the telescopic arm.

Telescopic Arm

The telescopic arm 2 is mounted on the chassis 101 so as to be able to pivot about a pivot axis A121 between a low position, preferably substantially parallel to the plane in which the wheels of the machine rest on the ground, and a high position. The pivot axis is located on the rear side of the machine, that is to say closer to the rear axle than the front axle. In the example illustrated in the drawings, the first section 21 is thus mounted in an articulated manner on the chassis 101 of the machine 100.

The machine is fitted with a lifting ram, not shown, which is connected in an articulated manner to the chassis 101 and to a part L121 of the arm 2 to control the pivoting of the arm 2. In particular, the lifting ram is connected in an articulated manner to the first section 21 of the arm 2.

The telescopic arm 2 is fitted with a tool holder 5. The tool holder 5 is able to receive a tool such as forks or a bucket (not shown).

The telescopic arm 2 comprises a first section 21 and a second section 22 mounted so as to be able to slide into the first section 21. In a particular embodiment, the arm comprises two sections. In other embodiments, it is possible to provide that the arm comprises more than four sections.

According to a particular aspect, and as for example illustrated in the drawings, the second section 22 has an end portion inclined in relation to that portion of this second section 22 that is able to slide in the first section 21. The inclined portion of the second section 22 is equipped, at its end opposite the first section 21, with the tool holder 5.

The arm 2 is configured to pivot about an axis transverse to the longitudinal axis of the machine (horizontal axis when the machine rests on a horizontal ground) so as to be displaced between a lowered position and a raised position. The arm makes it possible to reach different angles of inclination in relation to the plane in which the wheels of the machine rest on the ground, and notably to reach, in the high position, a maximum angle, for example comprised between 55° and 70°, in relation to the plane in which the wheels of the machine rest on the ground. The minimum angle that can be reached by the arm in the low position in relation to the plane in which the wheels of the machine rest on the ground is, for example, comprised between −5° and 5°.

As illustrated in the drawings, the section 22 of the arm 2 that is furthest away from the pivot axis A121 bears the hydraulic actuator system 6. The hydraulic actuator system 6 comprises an inclination ram 61 and possibly one or more other hydraulic actuation members, such as rams and/or hydraulic motors. The inclination ram 61 of the tool holder 5 makes it possible to control the pivoting of the tool holder 5 in relation to the second section 22.

The handling machine 100 comprises a hydraulic control circuit which comprises a pump, a hydraulic distributor 130 and a hydraulic pipe system for supplying the hydraulic actuator system 6 borne by the arm 2. In particular, the hydraulic distributor 130 makes it possible, using the hydraulic pipe system, to supply the inclination ram and one or more hydraulic members for controlling accessories, if appropriate. The hydraulic pump can be actuated using the engine of the system for displacing the machine in relation to the ground and/or using a separate motor.

Telescopic Ram

The arm 2 accommodates a telescopic ram 23 which makes it possible to displace the second section 22 in relation to the first section 21, in order to displace the arm 2 between a position referred to as retracted, of smaller length, and an extended position of greater length.

The telescopic ram 23 is supplied by the hydraulic control circuit. In particular, the telescopic ram 23 is attached to the hydraulic distributor 130.

The body 231 of the telescopic ram 23 is fixed to the first section 21, and that end of the rod 232 that is opposite the body 231 of the telescopic ram 23 is fixed to the second section 22.

Figure 4:
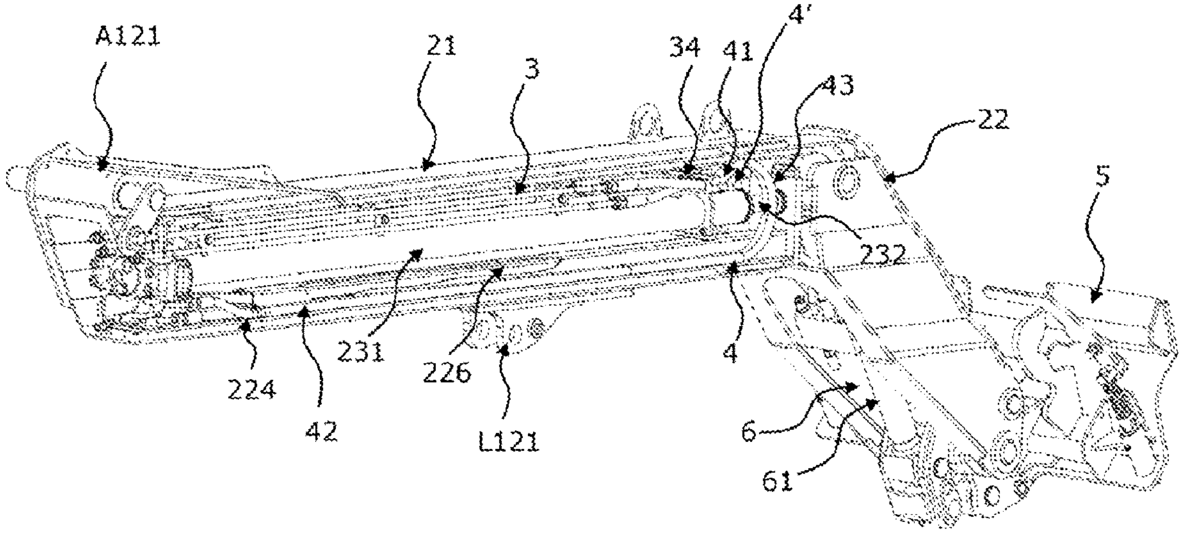
FIG. 4 is a perspective view, in section, of part of the telescopic arm of FIG. 3, in the retracted position, showing the arrangement on the inside of said arm of flexible hydraulic pipes for supplying an inclination ram, the bent portion of each flexible hydraulic pipe being located on the side of that part of the rod of the telescopic ram that protrudes from the body of the ram.
Figure 5:
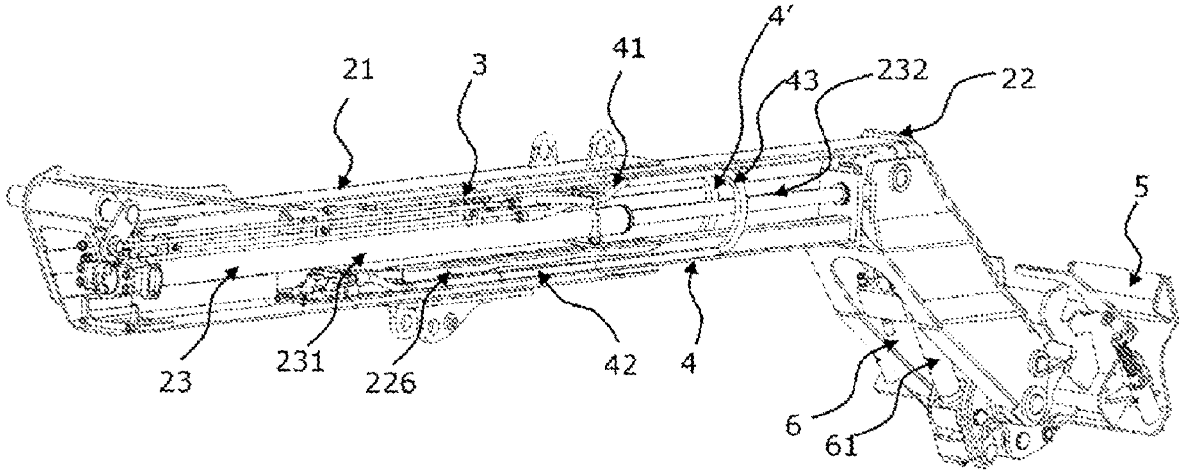
FIG. 5 is a view of the telescopic arm of FIG. 4, in a halfway-extended position of the arm, showing the positioning of the bent parts of the flexible hydraulic pipes on the side of the protruding part of the rod of the telescopic ram.
Figure 6:
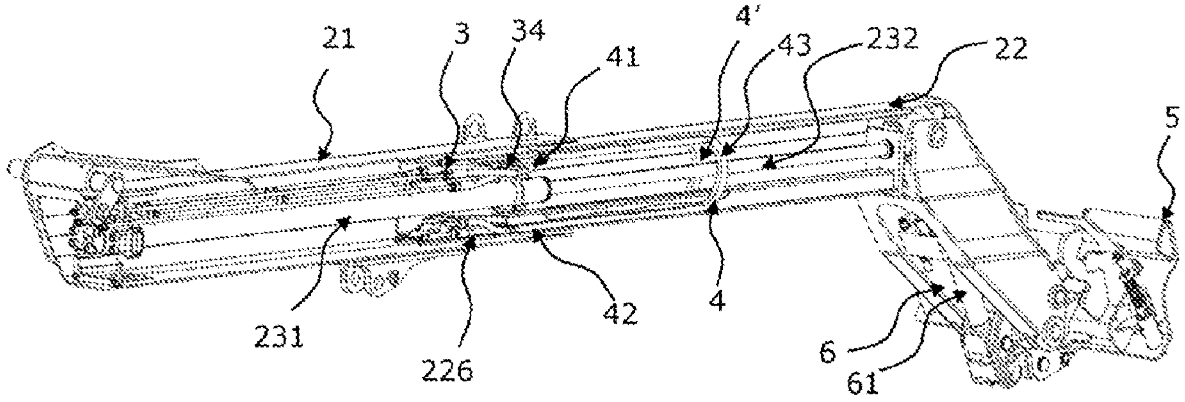
FIG. 6 is a view of the telescopic arm of FIG. 4, in an extended position of the arm, showing the positioning of the bent parts of the flexible hydraulic pipes on the side of the protruding part of the rod of the telescopic ram.

As illustrated in FIGS. 4, 5, and 6, that part of the rod 232 that extends out of the ram 23 extends inside the second section 22 of the arm.

Hydraulic Pipe System

The hydraulic pipe system extends at least partially inside the arm 2 and is attached to the hydraulic actuator system 6 to supply the hydraulic actuator system 6.

The hydraulic pipe system comprises at least one flexible hydraulic pipe which extends inside the arm 2. In one embodiment, and in the example illustrated in the drawings, multiple flexible hydraulic pipes which extend inside the arm are provided.

Figure 7:
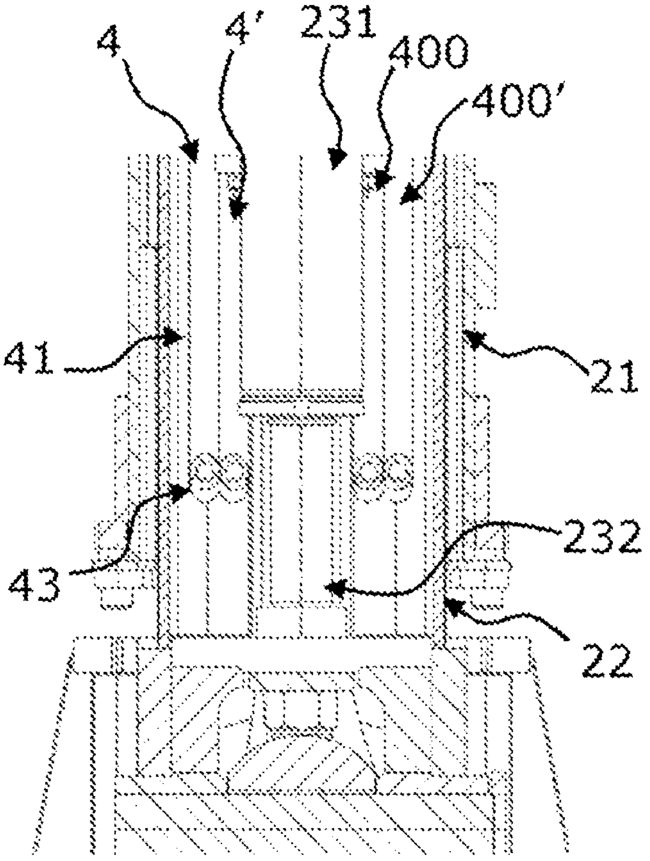
FIG. 7 is a top view, in longitudinal section, of part of the telescopic arm of FIG. 3, showing the space available between the bent parts of the flexible hydraulic pipes, the protruding part of the rod of the telescopic ram, and the internal wall of the second arm section.

In one embodiment and as illustrated in FIG. 7, what is provided is a pair of flexible hydraulic pipes 4, 4' for supplying the inclination ram 61, and another pair of flexible hydraulic pipes 400, 400' for supplying another hydraulic member, such as another ram or a hydraulic motor. The flexible hydraulic pipes 4, 4' (like the flexible pipes 400, 400') are referred to as twinned in the sense that they extend parallel to one another, and next to one another.

Advantageously, the two pairs of flexible hydraulic pipes are distributed on either side of the longitudinal axis of the telescopic ram 23. The longitudinal axis of the arm or of the telescopic ram is the longitudinal axis that, seen from above, passes through the center of the arm or of the telescopic ram.

Advantageously, the telescopic ram is centered inside the arm, as can be seen in FIG. 7.

In particular, the pairs of pipes 4, 4' and 400, 400' extend one on one side of the vertical median plane of the arm, and the other on the other side of this vertical median plane. The vertical median plane is the plane which passes through the longitudinal axis of the arm (or of the telescopic ram) and the vertical plane when the machine rests on a horizontal ground.

The following description is given for a flexible hydraulic pipe, given the reference 4, but may also apply to the one or more other flexible hydraulic pipes. In particular, the description given for the flexible pipe 4 can also be applied to the other flexible hydraulic pipe 4' and/or to the other pair of pipes 400, 400'.

The pipe 4 has a first portion 41, which is fixed in relation to the first section 21. According to a particular aspect, a clamping device 34 makes it possible to keep the first portion 41 of flexible pipe coupled to the body 231 of the telescopic ram 23. In other words, in the example illustrated in the drawings, the first portion 41 is attached to the ram body.

The clamping system 34 takes, for example, the form of two components which sandwich a part of the flexible pipe 4. The pipe 4 has an end, located on the side of the first portion 41, which is attached to a rigid pipe system 3. According to a particular aspect, the rigid pipe system 3 is attached to the hydraulic distributor 130 via connection hoses.

The pipe 4 also has a second portion 42, which is fixed in relation to the second section 22. According to a particular aspect, a rigid attachment device 224 makes it possible to keep the second portion 42 of flexible hydraulic pipe 4 coupled to the internal wall of the second arm section 22.

The attachment device 224 is attached to one or more other flexible connection pipes which extend, preferably inside one or more channels, along the second arm section 22 so as to be able to supply the hydraulic actuator system 6.

In particular, each flexible hydraulic pipe 4, 4' is connected via the attachment device 224 to a flexible pipe 226 in order to ensure the oil flows to the corresponding inclination ram 61 of the hydraulic actuator system.

In the example illustrated in the drawings, the inclination ram 61 is a double-acting ram. One 4 of the flexible hydraulic pipes makes it possible to supply a first chamber of the inclination ram 61, the other 4' flexible hydraulic pipe of the pair being configured to supply a second chamber of the inclination ram 61.

According to a particular aspect, that end of the pipe 4 that is opposite that fixed to the rigid pipe system 3 is fixed to the rigid attachment device 224.

As a result, the second portion 42 of the flexible hydraulic pipe 4 is fixed to the wall of the second section 22 via the rigid attachment system 224.

In one embodiment and as illustrated in FIGS. 4, 5, and 6, the clamping system 34 is located on the side of that end of the body 231 of the ram out of which the rod of the ram extends. In one embodiment and as illustrated in FIGS. 4, 5, and 6, in the retracted position of the arm 2, the rigid attachment system 224 is located on the side of that end of the body of the telescopic ram that is opposite the end from which the rod of the ram extends. According to a particular aspect, in the extended position of the arm 2, the rigid attachment system 224 is located on the side of that end from which the rod of the ram extends.

A U-shaped third portion 43 of the pipe 4, which is also referred to as bend, connects the first portion 41 and the second portion 42 of the pipe 4 to one another.

The concavity of the bend 43 is oriented toward that end of the first section 21 that is opposite that end of the first section 21 that defines the opening into which the second section 22 extends.

According to a particular aspect and as illustrated in FIGS. 4, 5, and 6, the concavity of the bend 43 of the pipe 4 is oriented toward that end of the first section 21 that is provided with the pivot axis A121 about which the arm 2 pivots in relation to the chassis 101 of the machine.

As can be seen in FIGS. 4, 5, and 6, the position of the return 43 in relation to the first section 21 and the second section 22 varies depending on the position of the second section 22 in relation to the first section 21. The displacement of the second section 22 in relation to the first section 21 thus causes a displacement of the bend 43 of the pipe 4 inside the second section 22.

FIG. 7 illustrates the arrangement of the pipes 4, 4' and 400, 400' at their bend 43. It can thus be seen that the bends (or loops) of the pipes present in the second section 22 at the rod 232 of the telescopic ram that extends out of the ram body have enough space around them that their displacement, resulting from the displacement of the second section 22 in relation to the first section 21, does not cause malfunction or damage of these pipes or of elements of the arm.

In other words, proceeding from the rigid pipe system 3, the flexible pipe 4 extends toward the front of the arm (that is to say toward the tool holder 5), then turns (makes a U-turn) to go back toward the rear of the arm (that is to say toward the first section) as far as the rigid attachment system 224, such that the bend 43 of the flexible pipe 4 extends from the side of that part of the rod that extends out of the body of the ram and thus in a wider space than the space in which the body of the ram is located, on account of the ram rod having a smaller width or cross section than the ram body.

The bend 43 of the flexible pipe 4 is not fixed to the ram rod, this allowing it to be displaced along this rod in the course of the movement of the second section 22 in relation to the first section.

In one embodiment, the wall of the second section makes it possible to guide and support the bend 43 of the flexible pipe 4.

By way of example, for an internal width of the second section 22 of 150 millimeters, a width of the rod 232 of the telescopic ram of 35 millimeters and a width of each pair of flexible pipes of 35 millimeters, the average clearance between the flexible pipes and the assembly of the rod and the internal wall of the second section 22 is 11.25 millimeters along a direction orthogonal to the rod 232 and to the vertical when the machine rests on a horizontal ground, that is to say along a direction parallel to the axis of articulation P121.

Along the longitudinal axis of the arm, the bottom of the bend 43 of the flexible pipe 4 (or bottom of the U) is located in the second section 22 at a distance from the body of the ram, in the zone of the second section 22 in which that part of the rod which extends out of the body of the ram extends, thereby leaving the bend 43 enough space for a slight displacement of this loop in the course of the displacement of the second section 22 in relation to the first section 21 when the arm is being transferred from its retracted position to its extended position. Specifically, such an arrangement of the flexible pipe limits the risk of jamming or deterioration of the flexible pipe and thus makes the operation of the arm more reliable whilst still making it possible to conserve a passage for the flexible pipe inside the arm, this also limiting the risk of exposure of this flexible pipe.

Anti-buckling shoes may be interposed between the ram body and the second section.

It is thus possible to design a compact machine, such as an ultra-compact telescopic carrier, of which the width of the arm is reduced in comparison with conventional machines having an arm width of 250 millimeters overall, in order to reduce the mass of the machine and to ensure good compactness of the machine, whilst still conserving a given overall length of the machine, for example 1.49 m, without reducing the functional clearances for the one or more hoses, that is to say without running the risk of degradation or malfunction of the arm or of the one or more flexible hydraulic pipes inside the arm.

The width of the arm or of the machine is considered along a direction orthogonal to the longitudinal axis of the machine and parallel to the plane in which the rolling members of the machine rest on the ground.

Keeping the one or more flexible pipes inside the arm makes it possible to not have to position them outside the arm, this limiting the risks of these pipes snagging when the machine is performing maneuvers.

In addition, a reduced width of the arm (also referred to as boom) makes it possible to place the arm between the cab and the engine assembly, this making it possible to obtain better visibility for the user.

The proposed arrangement of the flexible pipes inside the arm also makes it possible to not increase the pressure drops in the hydraulic circuit.

As recalled above, the disclosure can particularly advantageously be applied to machines with an arm of reduced cross section, notably for machines of which the arm has a width of about 200 millimeters in comparison with the arms of other machines having a width of about 250 millimeters, but is also applicable to other handling machines with telescopic arms.

The disclosure is not limited to the embodiments illustrated in the drawings.

In addition, the term "comprising" does not exclude further elements or steps. Moreover, features or steps which have been described with reference to one of the embodiments set out above can also be used in combination with further features or steps of other embodiments set out above.

The invention claimed is:

1. A handling machine comprising:
- a telescopic arm including a first section and a second section mounted to slide into the first section;
- a telescopic ram configured to displace the second section in relation to the first section;
- a hydraulic actuator system coupled to the second section of the telescopic arm; and
- a hydraulic control circuit including a hydraulic pipe system extending at least partially inside the telescopic arm and attached to the hydraulic actuator system to supply the hydraulic actuator system;

wherein,
- the telescopic ram includes
  - a ram body mounted fixedly in relation to the first section and
  - a ram rod mounted to slide between a retracted position in the ram body and an extended position,
- the hydraulic pipe system includes at least one flexible hydraulic pipe that extends inside the telescopic arm and includes
  - a first portion fixed in relation to the first section,
  - a second portion fixed in relation to the second section, and
  - a U-shaped third portion connecting the first portion and the second portion to one another,
- the concavity of the U-shaped third portion is oriented toward a distal end of the first section,
- the distal end is opposite a proximal end of the first section,
- the proximal end defining an opening, and
- the second section extending into the opening such that when the ram rod is actuated from the retracted position to the extended position, the U-shaped third portion moves along an external part of the ram rod of the telescopic ram extending out of the ram body of the telescopic ram.

2. The handling machine of claim 1, wherein a bend of the at least one flexible hydraulic pipe extends into a space defined by the external part of the ram rod of the telescopic ram extending out of the ram body of the telescopic ram.

3. The handling machine of claim 1, wherein the first portion of the at least one flexible hydraulic pipe is fixed to the ram body of the telescopic ram.

4. The handling machine of claim 1, wherein the second portion of the at least one flexible hydraulic pipe is fixed to an internal wall of the second section.

5. The handling machine of claim 1, wherein the at least one flexible hydraulic pipe includes at least one pair of flexible pipes.

6. The handling machine of claim 1, wherein the at least one flexible hydraulic pipe includes at least two pairs of flexible pipes, one of the pairs being disposed on one side of a longitudinal axis of the telescopic ram and the other pair being disposed on the other side of the longitudinal axis of the telescopic ram.

7. The handling machine of claim 1, wherein
- the hydraulic actuator system includes a double-acting hydraulic actuator,
- the at least one flexible hydraulic pipe includes a pair of flexible hydraulic pipes,
- a first flexible hydraulic pipe of the pair is configured to supply a first chamber of the double-acting hydraulic actuator, and
- a second flexible hydraulic pipe of the pair is configured to supply a second chamber of the double-acting hydraulic actuator.

8. The handling machine of claim 5, wherein the pair of flexible hydraulic pipes is disposed on one side of a vertical median plane of the telescopic arm, the vertical median plane passing through a longitudinal axis of the telescopic arm when the machine rests on a horizontal ground.

9. The handling machine of claim 1, further including a tool holder articulably connected to the second section and configured to receive a tool, wherein
- the hydraulic actuator system includes a hydraulic inclination ram coupled to
  - the second section via the ram body,
  - the tool holder via the ram rod, and
  - the at least one flexible hydraulic pipe, and
- the hydraulic inclination ram is configured to pivot the tool holder relative to the second section.

10. The handling machine of claim 9, wherein
- the hydraulic actuator system includes a hydraulic actuator configured to actuate an accessory associated with the hydraulic actuator, and
- the hydraulic actuator is coupled to the second section and connected to the at least one flexible hydraulic pipe.

11. The handling machine of claim 1, wherein
- the at least one flexible hydraulic pipe is attached to the hydraulic actuator system via the second portion,
- the second portion is connected to a connection system fixed to the second section, and
- the at least one flexible hydraulic pipe is attached to the hydraulic actuator system via at least one flexible connection pipe connected to the connection system and to the hydraulic actuator system.

12. The handling machine of claim 1, further comprising a chassis having a rear end and a forward end, wherein the telescopic arm is articulably connected to the rear end of the chassis.

13. The handling machine of claim 1, wherein the U-shaped third portion is in contact with an internal wall of the second section to guide the U-shaped third portion during displacement of the U-shaped third portion.

14. A handling machine comprising:
- a telescopic arm including a first section slidably engaged with a second section;
- a hydraulic actuator disposed in the telescopic arm and configured to slidably move the first section relative to the second section, the hydraulic actuator including
  - a body mounted to the first section and
  - a rod mounted to the second section and slidably engaged with the body, the rod extending at least partially into the body; and
- a flexible hydraulic pipe at least partially disposed in the telescopic arm and including
  - a first portion mounted to the first section,
  - a second portion mounted to the second section, and a U-shaped third portion connecting the first portion to the second portion, wherein, when the rod slides relative to the body, the U-shaped third portion moves along the rod.

15. The handling machine of claim 14, wherein the U-shaped third portion is between the rod and an internal surface of the second section.

16. The handling machine of claim 14, wherein when the rod slides relative to the body, the U-shaped third portion moves along an internal surface of the second section.

17. The handling machine of claim 14, wherein the flexible hydraulic pipe is connected to the hydraulic actuator.

* * * * *